(12) United States Patent
Tsukada (10) Patent No.: US 11,438,471 B2
(45) Date of Patent: Sep. 6, 2022

(54) IMAGE FORMING APPARATUS AND CONTROL METHOD FOR DISPLAYING A PREVIEW IMAGE AND DISPLAYING RELATED OBJECTS

(71) Applicant: CANON KABUSHIKI KAISHA, Tokyo (JP)

(72) Inventor: Yoshihiro Tsukada, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/231,912

(22) Filed: Apr. 15, 2021

(65) Prior Publication Data

US 2021/0234968 A1 Jul. 29, 2021

Related U.S. Application Data

(63) Continuation of application No. 16/692,075, filed on Nov. 22, 2019, now Pat. No. 11,006,009.

(30) Foreign Application Priority Data

Nov. 29, 2018 (JP) .............................. JP2018-224131

(51) Int. Cl.
*G06F 15/00* (2006.01)
*G06F 1/00* (2006.01)
*G06K 1/00* (2006.01)
*H04N 1/00* (2006.01)

(52) U.S. Cl.
CPC ....... *H04N 1/0044* (2013.01); *H04N 1/00411* (2013.01); *H04N 1/00501* (2013.01); *H04N 2201/0094* (2013.01)

(58) Field of Classification Search
CPC .......... H04N 11/0044; H04N 11/00411; H04N 1/00501; H04N 2201/0094
USPC ............................... 358/1.15, 1.14, 1.13, 1.1
See application file for complete search history.

(56) References Cited

U.S. PATENT DOCUMENTS

| | | | |
|---|---|---|---|
| 11,127,113 B2* | 9/2021 | Matsushima | ...... H04N 5/23296 |
| 2012/0019701 A1 | 1/2012 | Misawa | |
| 2017/0302809 A1 | 10/2017 | Shogaki | |
| 2020/0177735 A1 | 6/2020 | Tsukada | |
| 2021/0279713 A1* | 9/2021 | Lee | ........................ G07F 19/209 |

FOREIGN PATENT DOCUMENTS

| | | |
|---|---|---|
| CN | 102413264 A | 4/2012 |
| JP | 0937063 A | 2/1997 |

* cited by examiner

*Primary Examiner* — Douglas Q Tran
(74) *Attorney, Agent, or Firm* — Canon U.S.A., Inc. IP Division (57) ABSTRACT

An image forming apparatus is an image forming apparatus including an operation unit that includes a touch panel. The image forming apparatus further includes a display control unit configured to cause the touch panel to display an image and a detection unit configured to detect a touch operation performed by a user on the touch panel. In response to the detection unit detecting the touch operation on the touch panel that is displaying an object on the image, the display control unit performs control to hide the object from display.

17 Claims, 10 Drawing Sheets

IMAGE FORMING APPARATUS AND CONTROL METHOD FOR DISPLAYING A PREVIEW IMAGE AND DISPLAYING RELATED OBJECTS

CROSS-REFERENCE TO RELATED APPLICATIONS

This application is a continuation application of currently pending U.S. patent application Ser. No. 16/692,075 filed on Nov. 22, 2019 which claims the benefit of Japanese Patent Application No. 2018-224131 filed Nov. 29, 2018, both of which are hereby incorporated by reference herein in their entirety.

BACKGROUND OF THE INVENTION

Field of the Invention

The present invention relates to display of a preview image and display of related objects.

Description of the Related Art

For users of an image forming apparatus, a function for displaying a preview image on an operation screen is advantageous and important in that users can check the content of image data before printing the image data for which a print instruction has been issued or before transmitting the image data for which a scan instruction has been issued, for example.

To display a preview image is to convert processing-target image data into a displayable image having a predetermined size to display the image on a screen of the image forming apparatus. In a case where a preview image is displayed, the screen for displaying the preview image can be divided into two areas, which are a preview area and an operation area.

By making the preview area larger than the operation area, image data that a user wishes to check can be displayed in a large area. Thus, such a large preview area contributes to user convenience. Japanese Patent Laid-Open No. 2017-225185 can increase the preview area by using a function for changing the sizes of the preview area and the preview image.

In the related art, however, an object displayed on an image in the preview area remains even if the preview area can be increased. Operation/display objects in the preview area are not assumed to be so influential on the user convenience if the screen has a relatively large size, such as 10 inches. In contrast, if the screen has a relatively small size, such as 5 inches, the display on the screen of operation/display objects having the same size as those displayed on the large screen probably degrades user visibility.

SUMMARY OF THE INVENTION

The present invention provides an image forming apparatus including an operation unit that includes a touch panel. The image forming apparatus further includes a display control unit configured to cause the touch panel to display an image and a detection unit configured to detect a touch operation performed by a user on the touch panel. In response to the detection unit detecting the touch operation on the touch panel that is displaying an object on the image, the display control unit performs control to hide the object from display.

Further features of the present invention will become apparent from the following description of embodiments with reference to the attached drawings.

DESCRIPTION OF THE EMBODIMENTS

Now, an image forming apparatus according to an embodiment of the present invention will be described below with reference to the drawings. Note that components described in the embodiment are examples, and the scope of the invention is not limited to these components. In addition, all combinations of the components described in the embodiment are not always necessary.

Figure 1:
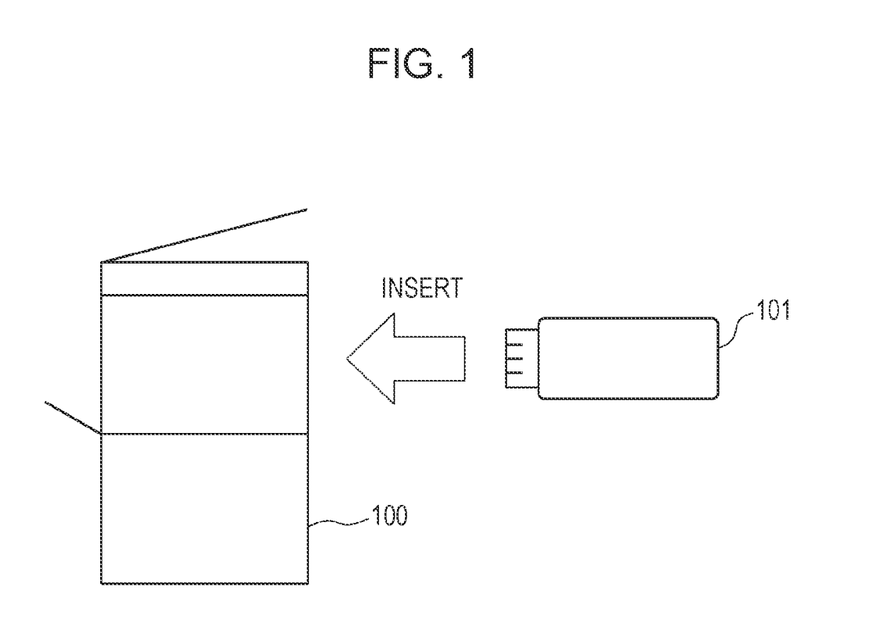
FIG. 1 illustrates an example of a system configuration according to an embodiment.

FIG. 1 illustrates an example of a system configuration according to the embodiment. An external memory such as a universal serial bus (USB) memory 101 is inserted into an image forming apparatus 100. The USB memory 101 stores at least one data item that can be displayed as a preview image. In the embodiment, a preview image of a data item stored in the inserted USB memory 101 is displayed on a screen. However, a preview image of a data item stored in the image forming apparatus 100, a cloud storage, or an external server may also be displayed.

Figure 2:
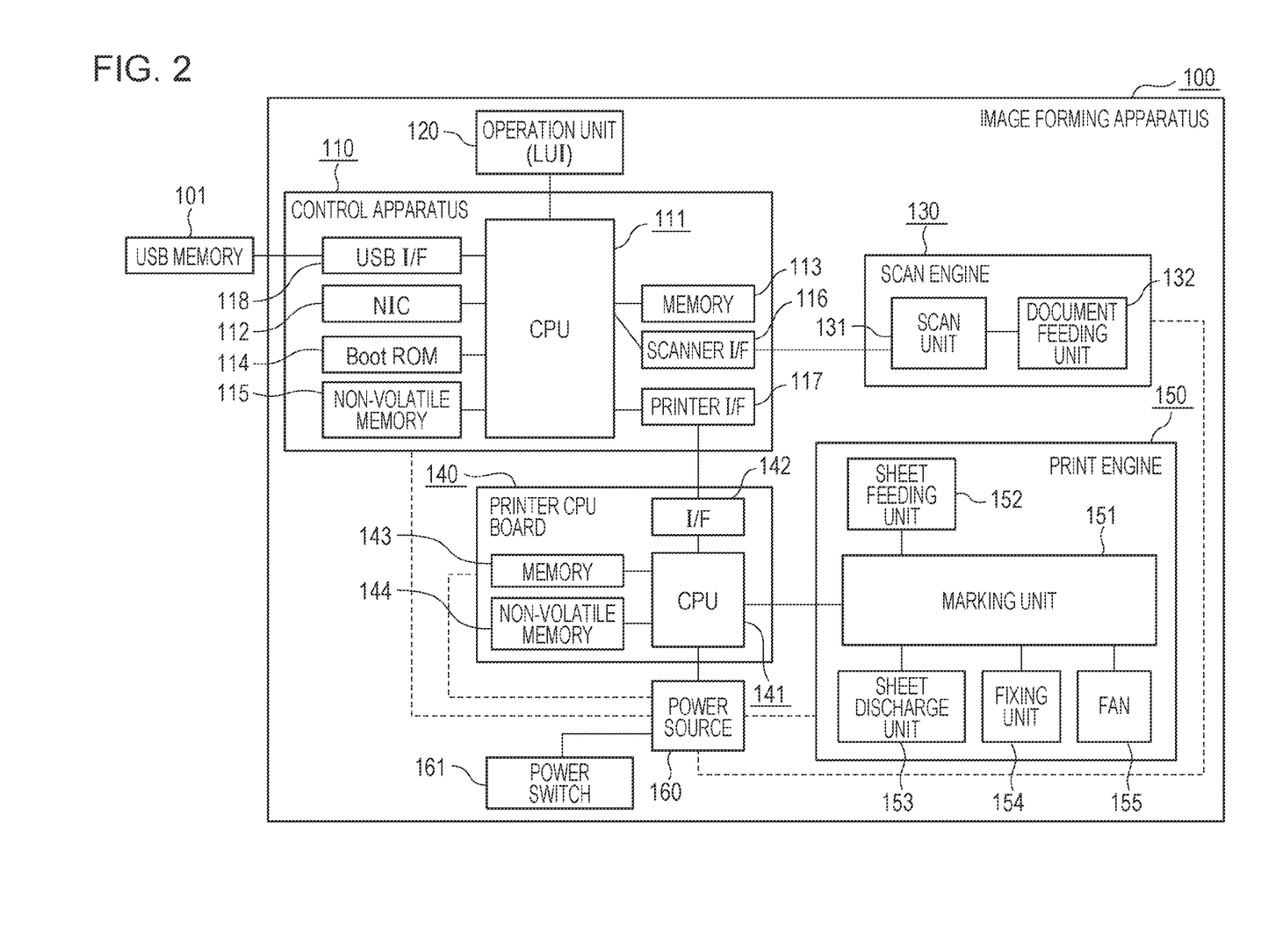
FIG. 2 illustrates an example of a hardware configuration of an image forming apparatus according to the embodiment.

FIG. 2 illustrates an example of a hardware configuration of the image forming apparatus 100 according to the embodiment. The image forming apparatus 100 is a so-called multifunction printer (MFP) including a scan engine 130 and a print engine 150. In addition, the image forming apparatus 100 further includes a control apparatus 110, an operation unit 120, a printer central processing unit (CPU) board 140, a power source 160, and a power switch 161. The scan engine 130 includes a scan unit 131 and a document feeding unit 132. The print engine 150 includes a marking unit 151, a sheet feeding unit 152, a sheet discharge unit 153, a fixing unit 154, and a fan 155. The marking unit 151 performs charging, exposure, developing, and transfer.

The scan engine 130 includes the scan unit 131 that can optically scan a document and can convert the document into a digital image and the document feeding unit 132 that can automatically and sequentially replace a bundle of documents. The scan engine 130 transmits the converted image data to the control apparatus 110.

The print engine 150 includes the marking unit 151 for printing the image data on a sheet of paper that is fed, the sheet feeding unit 152 that can sequentially feed each sheet from a bundle of sheets, and the sheet discharge unit 153 for discharging the sheet on which the image data is printed. In addition, the print engine 150 further includes the fixing unit 154 for fixing toner, printed by the marking unit 151, by heat and pressure, and the fan 155 for cooling.

The operation unit 120 is a local user interface (LUI) for a user to operate the image forming apparatus 100 and includes a touch panel for touch-panel operations, a display such as a liquid crystal apparatus for displaying a screen, and hard keys for receiving key inputs.

The control apparatus 110 is connected to these components, and a controller installed in the control apparatus 110 executes a job in the image forming apparatus 100. The control apparatus 110 is a general-purpose CPU system and includes a CPU 111 that controls the entire CPU board, a memory 113 that is used by the CPU 111 as a work memory, and a Boot read-only memory (ROM) 114 including a boot program. In addition, the control apparatus 110 further includes a network interface card (NIC) 112 for connecting the image forming apparatus 100 to an external apparatus via a network, a USB interface (I/F) 118 that controls input/output from/to the USB memory 101, and a non-volatile memory 115 including firmware. The non-volatile memory 115 may be mounted on the CPU board or may be connected to the CPU board. Furthermore, the control apparatus 110 is connected to the printer CPU board 140 through a printer I/F 117 and an I/F 142 and is also connected to the scan engine 130 through a scanner I/F 116.

The printer CPU board 140 includes a CPU 141 that controls the entire board, a memory 143 that is used by the CPU 141 as a work memory, and a non-volatile memory 144.

The dotted line in FIG. 2 represents a power source line. The power source 160 supplies electric power to the control apparatus 110, the scan engine 130, the printer CPU board 140, and the print engine 150. The power switch 161 is a hardware switch for controlling ON and OFF of electric power supply. Upon turning on the power switch 161, the boot program in the Boot ROM 114 is loaded to the memory 113 and sequentially executed by the CPU 111, so that various hardware settings are set and an operating system (OS) is started. Upon completion of execution of the boot program in the Boot ROM 114, the CPU 111 operates in accordance with a program (firmware) of a controller stored in the non-volatile memory 115, and thus, a job becomes acceptable and executable.

Figure 3:
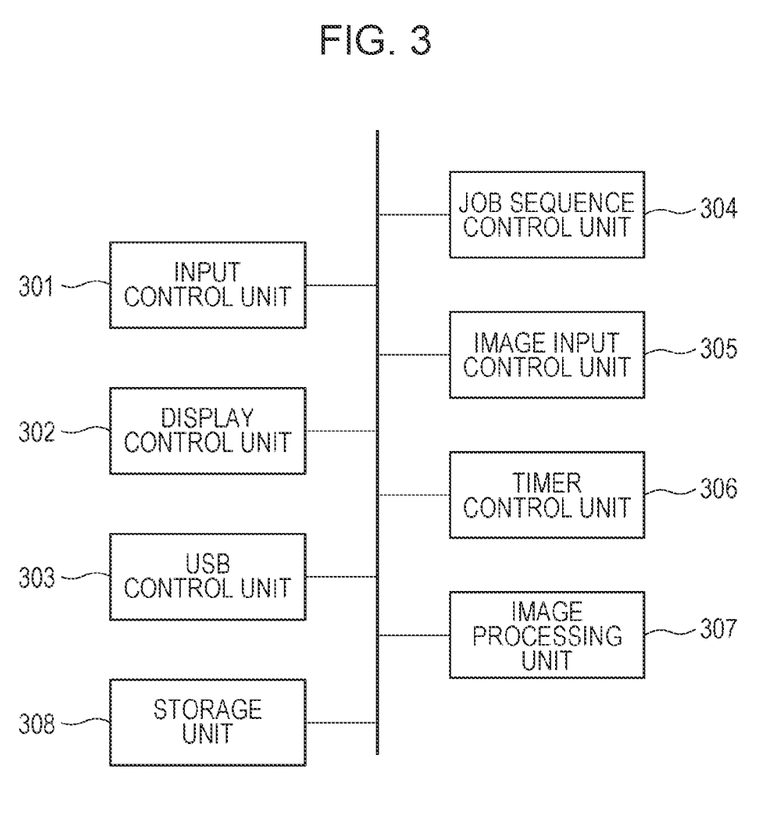
FIG. 3 illustrates an example of a software configuration of the image forming apparatus according to the embodiment.

FIG. 3 illustrates an example of a software module configuration of the image forming apparatus 100 according to the embodiment. Each functional unit illustrated in FIG. 3 is realized by the operation of the CPU 111 of the control apparatus 110 in the image forming apparatus 100.

An input control unit 301 receives an instruction that is input by a user through the operation unit 120 and notifies the other functional units of the content of the received instruction. In addition, if an event on a touch panel is received from the operation unit 120, the input control unit 301 publishes a touch event so that the touch event is interpreted easily by an application as described below. First, if a user's finger (including a stylus or the like for pressing the touch panel) touches the touch panel included in the operation unit 120, the input control unit 301 publishes a tap-in event together with the coordinates of the touched position. In this case, by regularly monitoring the position of the finger, the input control unit 301 publishes a drag event including information of the moved position. If it is determined that the finger does not touch the touch panel for a certain period, the input control unit 301 publishes a tap-out event including information of the position immediately before release of the finger. In addition, depending on the moving speed immediately before tap-out, the input control unit 301 publishes a flick event. These events start from tap-in and end by tap-out or a flick event in any case. A drag event may be performed during any of these events. A successive operation of two events that are a tap-in event and a tap-out event is expressed as a tap.

Detection of a user's finger, a stylus, or the like coming in contact with the touch panel is referred to as tap-in. Detection of this touch lasting a predetermined period or longer may also be determined as tap-in.

Release of the finger from the panel on which a touch is detected by tap-in or drag is referred to as tap-out. In accordance with an instruction from any of the other functional units, a display control unit 302 displays an operation menu or an instruction result on the operation unit 120.

A USB control unit 303 controls the USB I/F 118 and, in accordance with an instruction from any of the other functional units, controls input/output of information between the image forming apparatus 100 and the USB memory 101.

A job sequence control unit 304 creates a job in response to a notification from the input control unit 301 or the USB control unit 303 and executes the job. By giving an instruction at appropriate timing to the other functional units, the job sequence control unit 304 executes input jobs in a fixed order. In addition, when turning on the power of the image forming apparatus 100, the job sequence control unit 304 gives the other functional units an instruction for executing start processing.

An image input control unit 305 receives an instruction for starting a job from the job sequence control unit 304 and gives an instruction for setting parameters necessary for image processing or for starting image processing by using an image processing unit 307. In a case of media print, the image input control unit 305 reads an image in the USB memory 101 through the USB control unit 303 and requests the image processing unit 307 to perform data processing of the read data.

The image processing unit 307 performs image processing such as calibration or color conversion on image data such as JPEG data or page data interpreted by a functional unit (not illustrated) that performs page description language (PDL) processing.

A timer control unit 306 receives a request from each of the functional units and performs timer-related control such as generating or destructing a timer.

In accordance with an instruction from any of the other functional units, a storage unit 308 writes designated data into the memory 113 or the non-volatile memory 115 or reads data that is stored therein.

Figure 4:
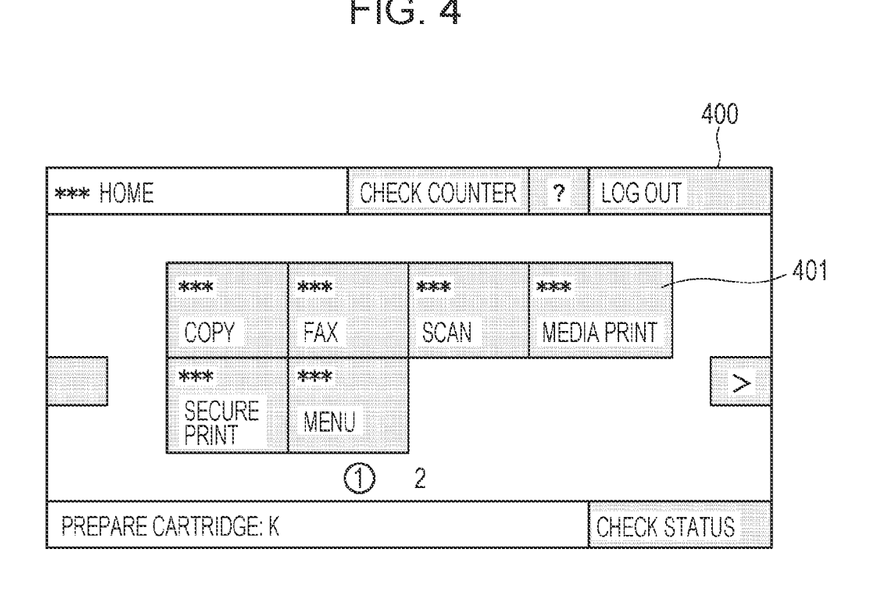
FIG. 4 illustrates an example of a home screen of the image forming apparatus according to the embodiment.

FIG. 4 illustrates an example of a home screen 400 displayed on the operation unit 120 of the image forming apparatus 100 according to the embodiment. Displayed buttons correspond to functions (e.g., copy, fax, scan, and media print) executable by the image forming apparatus 100. A user can select any of the functions by pressing the corresponding button.

If a media-print function button 401 is pressed, the operation unit 120 displays a list of file names corresponding to image data items stored in the USB memory 101 that is inserted into the image forming apparatus 100. A user selects a file name corresponding to an image data item that the user wishes to print, sets various print settings or the like, and performs printing.

Figure 5:
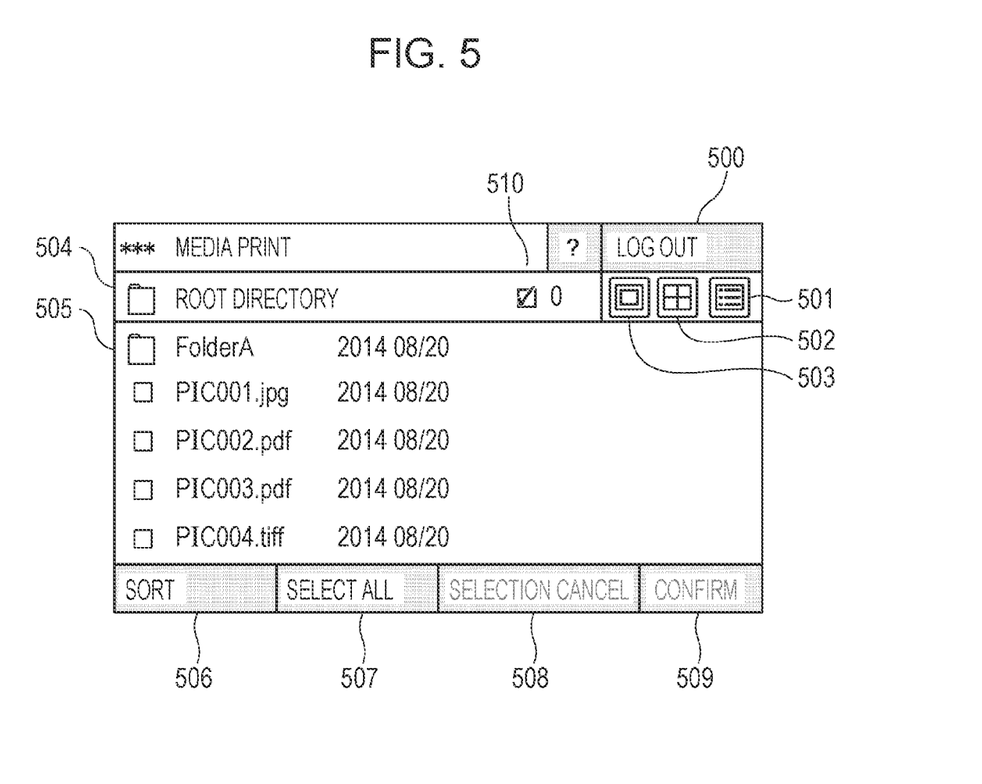
FIG. 5 illustrates an example of a list display screen of a media-print selected screen of the image forming apparatus according to the embodiment.
Figure 6:
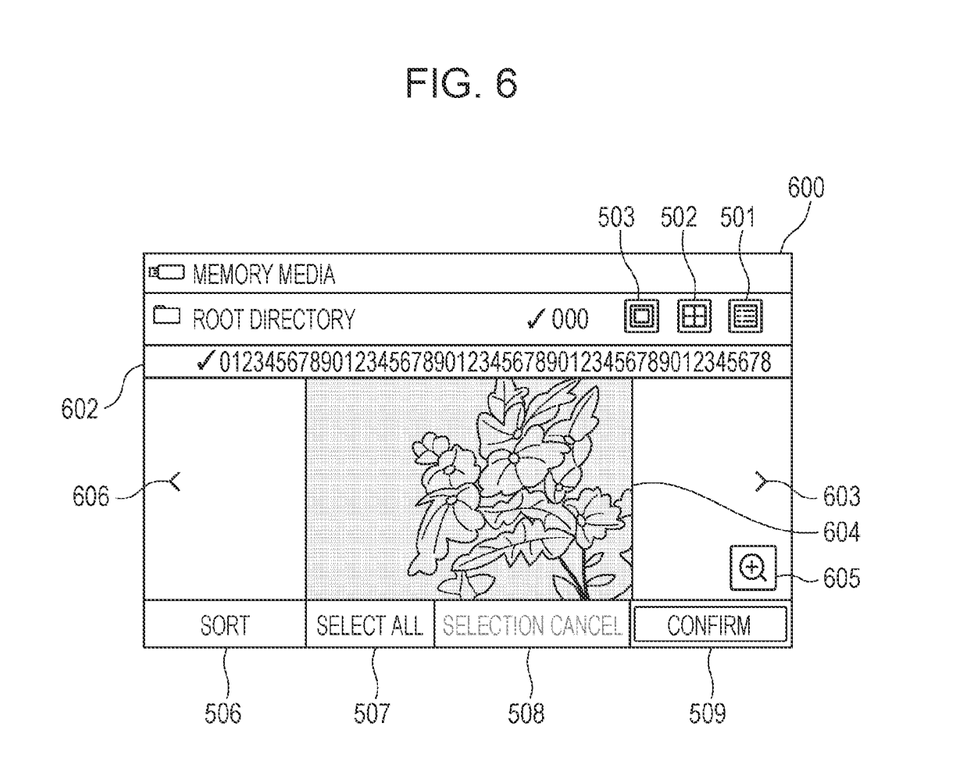
FIG. 6 illustrates an example of a preview-image display screen of the media-print selected screen of the image forming apparatus according to the embodiment.
Figure 7:
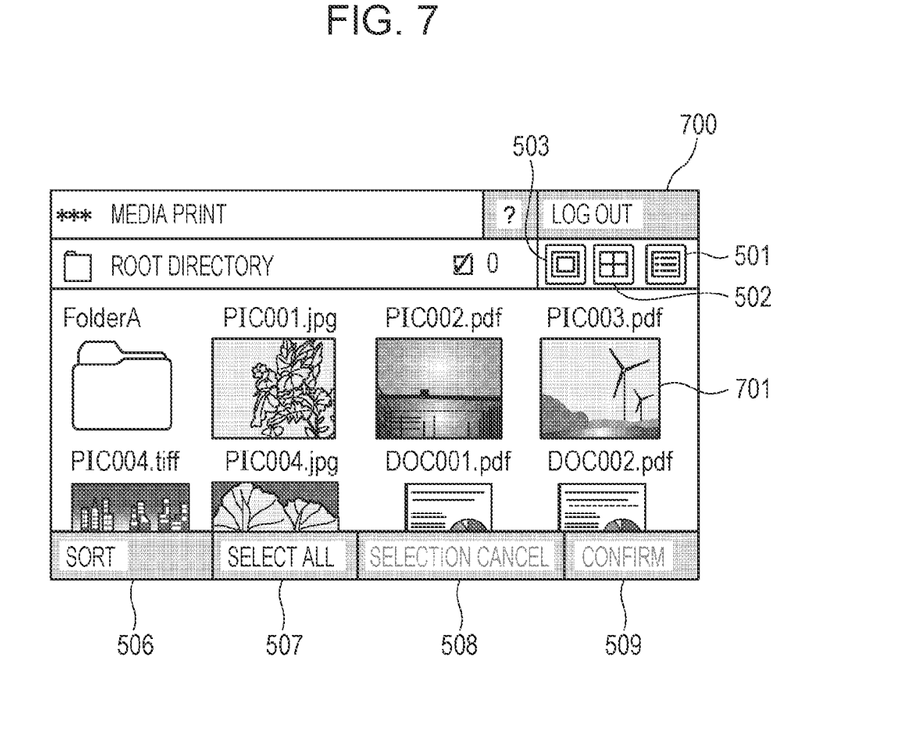
FIG. 7 illustrates an example of a thumbnail display screen of the media-print selected screen of the image forming apparatus according to the embodiment.

FIG. 5, FIG. 6, and FIG. 7 illustrate examples of a media-print selected screen displayed on the operation unit 120. For example, the media-print selected screen illustrated in FIG. 5 is displayed in response to a user pressing the media-print function button 401 on the home screen 400. On this screen, the user selects a file name corresponding to an image data item that the user wishes to print, sets desired print settings, and performs printing. The screens illustrated in FIGS. 5 to 7 can be displayed by the user tapping switch buttons 501 to 503 displayed on each of the media-print selected screens.

On the media-print selected screen, the user can select an image data item that the user wishes to print from among image data items included in the USB memory 101. At this time, the image data items in the USB memory 101 may be displayed in three ways as illustrated in FIGS. 5 to 7.

FIG. 5 illustrates a list display screen 500 on which a list of file names corresponding to image data items in the USB memory 101 is displayed. In response to a user pressing the switch button 501 for the list display screen, the list display screen 500 is displayed. In response to the user pressing the switch button 502 for a thumbnail display screen, a thumbnail display screen 700, which will be described later, is displayed. In response to the user pressing the switch button 503 for a preview-image display screen, a preview-image display screen 600, which will be described later, is displayed. If the USB memory 101 includes a folder, the name of the folder is displayed in a folder name display field 504 when files in the folder are displayed. If the currently displayed hierarchical level is the highest level or if the USB memory 101 does not have a folder hierarchy, a name indicating this is displayed. In this embodiment, the USB memory 101 includes a folder called Folder A, and a folder icon 505 represents a folder. If the user presses a sort button 506, a menu (not illustrated) for changing a display order of file names is displayed. If the user presses a select-all button 507, all files that are currently displayed are selected. If the user taps a given file name, the file corresponding to this file name is selected. If one or more files are selected, a selection cancel button 508 and a confirmation button 509 are validated, and the user can press the selection cancel button 508 to cancel all the selected files. If one or more files are selected, the user can press the confirmation button 509 to make the list display screen 500 transition to a media-print setting screen 800, which will be described later. The selected files may be provided with check marks, and the number of selected files may be displayed in a selection-number display field 510.

FIG. 6 illustrates the preview-image display screen 600 on which a preview image of a file of image data in the USB memory 101 is displayed. If a user presses the switch button 503 for preview-image display screen to display this screen, the user can specifically check the content of an image data item that is stored as a file. This is effective when, for example, the user wishes to check a whole picture of the stored image data item in a case where the user does not understand the content of the image data item from the file name or where a similar image data item is included in the memory. The name of the displayed file is displayed in a file name display field 602. If the user presses a display button 606, a preview image of the previous image data item is displayed. If the user presses a display button 603, a preview image of the following image data item is displayed. On this screen, a preview image 604 is selected by a tap. Operations performed after one or more files have been selected are the same or substantially the same as those on the list display screen 500. If the user taps a preview-image display screen switch button 605 (if the user gives an instruction for enlarged display), an enlarged preview-image display screen 900 that is a screen on which the preview image that is being displayed is displayed in an enlarged manner can be displayed.

FIG. 7 illustrates the thumbnail display screen 700 on which images corresponding to image data items stored in the USB memory 101 are displayed as thumbnail images. If a user presses the switch button 502 for thumbnail display screen to display this screen, the user can briefly understand the files (image data items) stored in the USB memory 101. This is effective when, for example, a large number of files are included in the USB memory 101 and the user wishes to understand brief content of the stored files immediately, even though the respective details are not obtained. On this screen, if the user taps a thumbnail image 701 that the user wishes to print, the file corresponding to this thumbnail image is selected. Operations performed after one or more files have been selected are the same or substantially the same as those on the list display screen 500.

Figure 8:
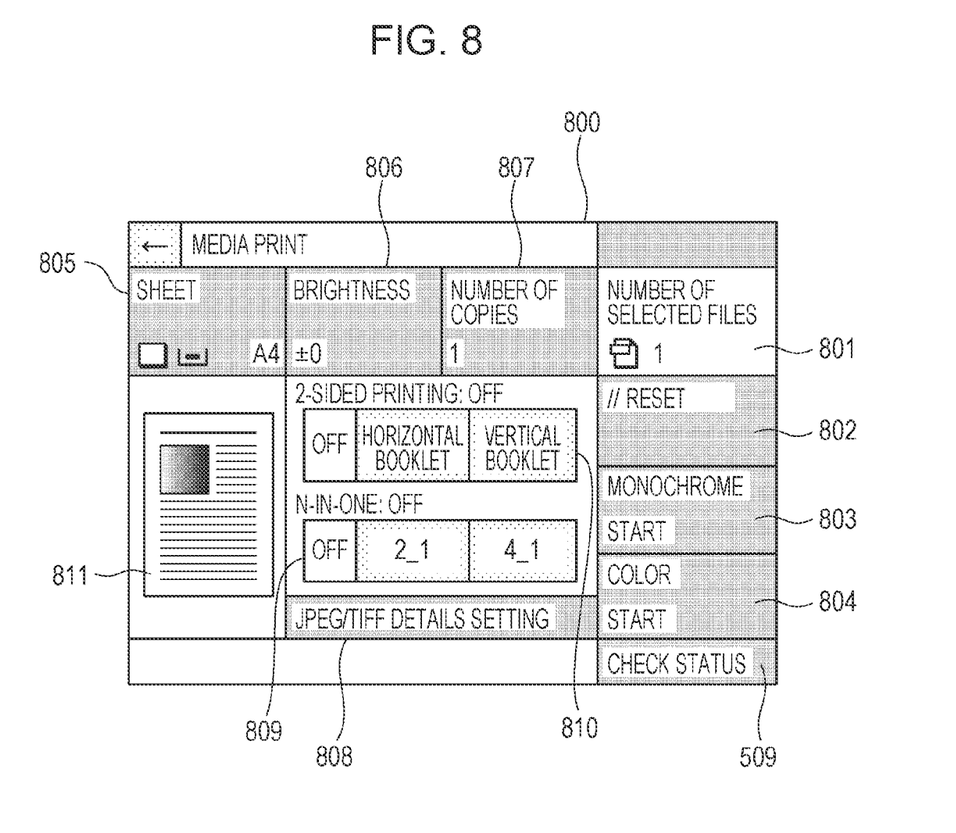
FIG. 8 illustrates an example of a media-print setting screen of the image forming apparatus according to the embodiment.

FIG. 8 illustrates an example of the media-print setting screen 800 that is a screen displayed if one of the files is selected on any of the media-print selected screen in FIGS. 5 to 7 and if the confirmation button 509 is pressed.

A number-of-selected-files display field 801 indicates the number of selected files, and FIG. 8 illustrates an example in which one file is selected. In a sheet setting field 805, a currently selected sheet and its paper cassette are displayed. A user can change the paper cassette by tapping the sheet setting field 805 and can select a paper cassette for which a desired paper size is set. In a brightness setting field 806, the user can set the brightness of image. In a number-of-copies setting field 807, the user can set the number of copies to be printed. If the user presses a detailed setting field 808, the screen transitions to a details setting screen (not illustrated) where the user can set detailed settings of an image processing function and the like. In a 2-sided printing setting field 810, the user can select whether to print on one side or both sides. In addition, if the user selects to print on both sides, the user can also select horizontal booklet printing or vertical booklet printing for finishing. In an N-in-one setting field 809, the user can set multiple pages on one sheet such as "2 in 1". In a preview field 811, if 2-sided printing and multiple pages on one sheet are selected, instead of a preview image of an image data item corresponding to the selected file, an image of a print to be obtained is displayed. The example on the screen illustrated in FIG. 8 is an image in a case where 1-sided printing is selected and multiple pages on one sheet is not selected. The user can reset (return to default settings) all customized settings in the setting fields by pressing a reset button 802. After customizing the settings in the setting fields, the user presses a monochrome start button 803 to print in monochrome or presses a color start button 804 to print in color. In addition, if the user presses the confirmation button 509, the screen transitions to another screen (not illustrated) on which the user can check the status of job or the like.

Figure 9A:
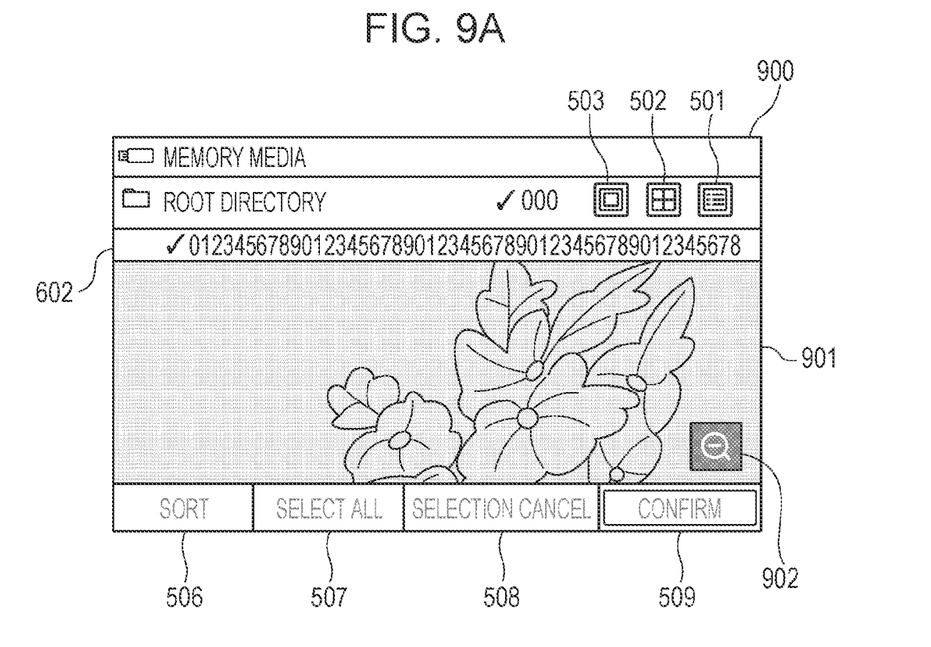
FIGS. 9A and 9B illustrate examples of an enlarged preview-image display screen of the media-print selected screen of the image forming apparatus according to the embodiment.
Figure 9B:
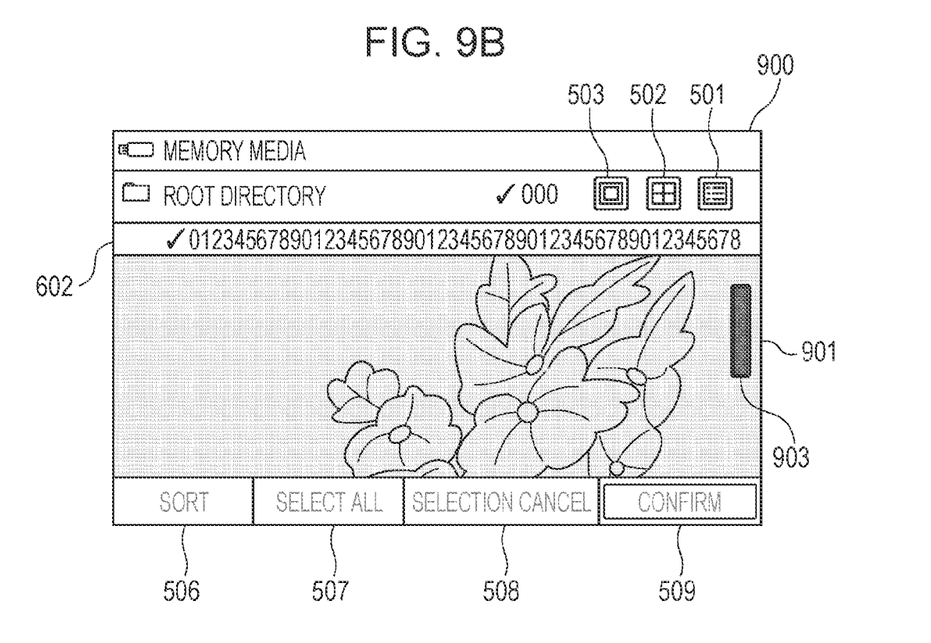

FIGS. 9A and 9B each illustrate the enlarged preview-image display screen 900 on which an image data item stored in the USB memory 101 is displayed in an enlarged manner. If a user taps the preview-image display screen switch button 605 on the preview-image display screen 600 illustrated in FIG. 6, the enlarged preview-image display screen 900 is displayed. Thus, since the preview image 604 is displayed in an enlarged manner, the user can check details of the preview image. That is, display of the enlarged preview-image display screen 900 enables the user to check details of the image, which the user cannot check on the preview image or thumbnail image.

In addition, an area for displaying an image on the preview-image display screen 600 illustrated in FIG. 6 and an area for displaying an image on the enlarged preview-image display screen 900 illustrated in FIGS. 9A and 9B are different and have different display formats.

The area for displaying the preview image on the enlarged preview-image display screen 900 illustrated in FIGS. 9A and 9B is larger than the area for displaying the preview image on the preview-image display screen 600. Thus, margins on the touch panel are narrower on the enlarged preview-image display screen 900 than on the preview-image display screen 600.

FIG. 9A is an initial screen displayed in response to a tap on the preview-image display screen switch button 605 on the preview-image display screen 600.

While a touch of a user's finger, a pointer used for giving an instruction to the image forming apparatus 100, or the like is detected on the preview area in which an enlarged image (enlarged preview image) 901 is displayed (while a tap is detected), the initial screen in FIG. 9A is switched to the screen illustrated in FIG. 9B.

If the user taps a reduction button 902 displayed on the enlarged preview image 901 in FIG. 9A, the enlarged preview-image display screen 900 transitions to the preview-image display screen 600.

The reduction button 902 is an operation object that can be operated by the user. The user can give an instruction to the image forming apparatus 100 through the operation object. Note that the above display button 603 and switch button 605 are also operation objects.

Among the operation objects, the reduction button 902 and the switch button 605 are buttons used by the user for giving an instruction for changing the display size of the preview image.

The reduction button 902, which is an operation object, is displayed to overlap with at least a part of the enlarged preview image 901.

A position indicator bar 903 in FIG. 9B is a display object for indicating the position of the enlarged preview image 901, which is being displayed on the screen, in the whole image, that is, which part of the enlarged preview image 901 is displayed.

If the part of the preview image that is displayed in an enlarged manner is an upper part of the image, the position indicator bar 903 is displayed in an upper part of the enlarged preview area. On the other hand, if the part of the preview image that is displayed in an enlarged manner is a lower part of the image, the position indicator bar 903 is displayed in a lower part of the enlarged preview area.

The position indicator bar 903 in this embodiment is placed on the right of the enlarged preview image 901 and indicates a position in the vertical direction of the preview image. However, the position indicator bar may alternatively be displayed on the left of the enlarged preview image 901.

Similarly, a position indicator bar for indicating a horizontal position may be displayed in an upper part or a lower part of the preview image.

Note that the user cannot give any instruction to the image forming apparatus 100 through the display object, that is, an object that the user cannot operate. However, display of the display object enables the user to obtain information about the image that is being displayed. In addition to the position indicator bar, a page number indicating a page of an image data item, a magnification indicating the display magnification of the image that is being displayed on the screen, and the like are display objects. Although not illustrated in FIG. 9B, these display objects may also be displayed on the operation unit 120 in this embodiment. Such a display object is displayed to overlap with at least a part of the enlarged preview image 901.

Since the margin on the enlarged preview-image display screen 900 is narrow, the operation object and the display object are displayed to overlap with at least a part of the preview image.

Figure 10:
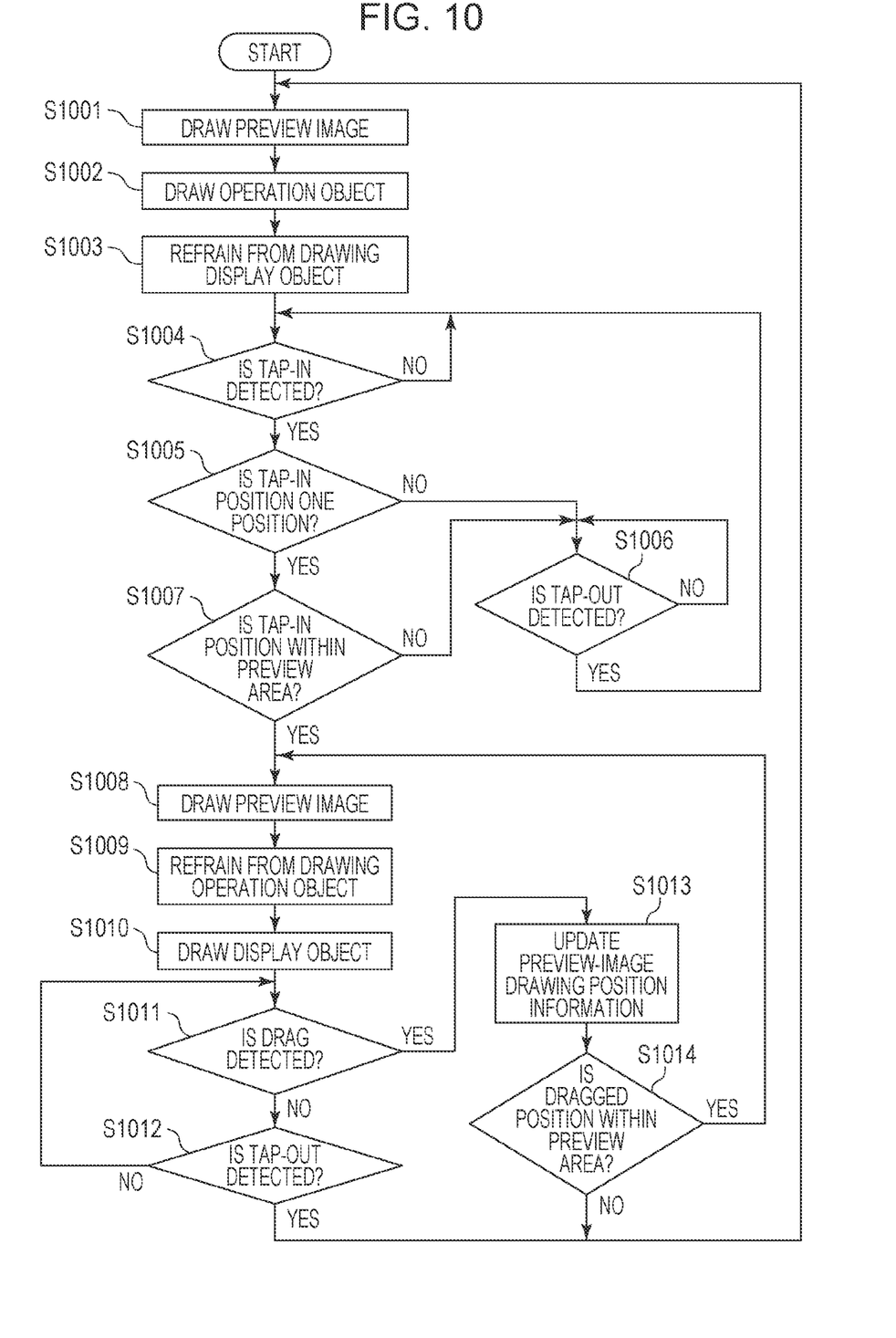
FIG. 10 is a flowchart illustrating an example of a process to which the present invention is applied on the preview-image display screen of the media-print selected screen of the image forming apparatus according to the embodiment.

A flowchart illustrated in FIG. 10 is an example of a process flow executed by the image forming apparatus 100 if user operations are made on the enlarged preview-image display screen 900 that is displayed on the operation unit 120 as a result of selection of a media print function. This flowchart is realized by the CPU 111 operating in accordance with firmware stored in the non-volatile memory 115.

Note that the following description is about a process performed if the media print function is selected and the enlarged preview-image display screen 900 is displayed on the operation unit 120. However, the same or substantially the same process is performed if an enlarged preview image of data stored in the image forming apparatus 100, a cloud storage, an external server, or the like is displayed.

First, in response to an instruction for displaying the enlarged preview-image display screen 900 on the operation unit 120, image information is obtained from the image input control unit 305. Subsequently, the display control unit 302 draws a display-target image on the operation unit 120 in an enlarged manner (S1001).

The display-target image is an image that is selected and displayed on the preview-image display screen 600 as in FIG. 6. In response to an instruction from a user, a preview image that is being displayed is displayed as the enlarged preview image 901 in the enlarged preview area on the operation unit 120.

In addition, at this time, the display control unit 302 also draws an operation object on the enlarged preview image 901 (S1002). At this time, the display control unit 302 performs control not to draw a display object on the enlarged preview image 901 displayed in the enlarged preview area (S1003). That is, as illustrated in FIG. 9A, an operation object and no display object are displayed on the enlarged preview image 901.

Subsequently, the input control unit 301 determines whether the user is pressing the touch panel for a predetermined period, that is, whether tap-in is detected (S1004). If no tap-in is detected (No in S1004), the input control unit 301 determines again whether tap-in is detected. If tap-in is detected (Yes in S1004), the process proceeds to S1005. Subsequently, the input control unit 301 determines whether the position where the tap-in has been detected is a single position (S1005). If it is determined that the tap-in has been detected at a plurality of positions (No in S1005), the input control unit 301 determines whether tap-out is detected at all the positions where the tap-in has been detected (S1006). This determination is made until tap-out is detected at all the positions where the tap-in has been detected (until Yes in S1006). If tap-out is detected at all the positions where the tap-in has been detected (Yes in S1006), the process proceeds to S1004. That is, tap-out at a plurality of positions is invalidated. If release of the user's finger from the touch panel is detected in S1006, the input control unit 301 determines whether the tap-in and tap-out have been performed on the reduction button 902. If the tap-in and tap-out have been performed on the reduction button 902, the display control unit 302 displays the preview-image display screen 600 illustrated in FIG. 6. If the tap-in and tap-out have been performed on the preview-image display screen switch button 605 on the preview-image display screen 600, the display control unit 302 displays the screen illustrated in FIG. 9A.

If the input control unit 301 has detected the tap-in at only a single position (Yes in S1005), the input control unit 301 further determines whether the position where the tap-in is detected is within the enlarged preview area on the basis of position information obtained when the tap-in is detected (S1007). In this embodiment, the reduction button 902 is not within the enlarged preview area. Thus, for example, if the reduction button 902 is selected on the screen illustrated in FIG. 9A, the process proceeds to No in S1007. If the position where the tap-in is detected is not within the enlarged preview area (No in S1007), the process proceeds to S1006. If the position where the tap-in is detected is within the enlarged preview area (Yes in S1007), the display control unit 302 draws the preview image again (S1008). At this time, the display control unit 302 performs control not to draw an operation object on the enlarged preview image 901 displayed in the enlarged preview area (S1009). In addition, the display control unit 302 draws a display object on the enlarged preview image 901 in the enlarged preview area (S1010). At this time, as illustrated in FIG. 9B, a display object and no operation object are displayed on the enlarged preview image 901.

Subsequently, the input control unit 301 detects a drag operation (S1011). If a drag operation is detected (Yes in S1011), the display control unit 302 updates the position information for drawing the enlarged preview image 901 (S1013). Subsequently, the input control unit 301 determines whether the drawing position that has been moved by the drag operation is within the enlarged preview area (S1014). The drag operation is detected if the user's finger that has performed tap-in moves from the tap-in position by a predetermined distance or more. When the user performs tap-out (releases the touch operation), the position that has been moved by the drag operation is determined.

If the position that has been moved by the drag operation is within the enlarged preview area (Yes in S1014), on the basis of the updated position information, the display control unit 302 performs drawing processing again (S1008, S1009, S1010). During this processing, the drawing position of the enlarged preview image 901 and the drawing position of the display object can be changed depending on the updated position information.

If the position that has been moved by the drag operation is not within the enlarged preview area (No in S1014), the display control unit 302 performs drawing processing again (S1001, S1002, S1003). Through this processing, the display object is no longer displayed on the enlarged preview image 901 on the screen, and an operation object is displayed on the enlarged preview image 901 on the screen. That is, the screen illustrated in FIG. 9A is displayed. In this case, the operation object may be hidden from display in a predetermined period of time. For example, a position indicator bar may be hidden from display in a few seconds after the end of drag operation. In this manner, the operation object and the display object on the preview image may be controlled to be displayed or hidden from display in a predetermined period, instead of immediately after detection of a user operation.

If no drag operation is detected (No in S1011), the input control unit 301 determines whether tap-out is detected (S1012). If tap-out is detected (Yes in S1012), the display control unit 302 performs drawing processing again (S1001, S1002, S1003). Through this processing, the display object is no longer displayed on the enlarged preview image 901 on the screen, and an operation object is displayed on the enlarged preview image 901 on the screen. That is, the screen illustrated in FIG. 9A is displayed. If no tap-out is detected (No in S1012), the input control unit 301 determines again whether a drag operation is detected (S1011).

Through the above process illustrated in the flowchart, an operation object is hidden from display while the user is performing a touch operation on the operation unit 120 on which the enlarged preview image is displayed. This is because the user is assumed to not perform any other operation while performing a touch operation on the enlarged preview image displayed on the operation unit 120. Thus, since unnecessary objects are not displayed while the user is performing a touch operation on the enlarged preview image, it is possible to obtain a larger area for the enlarged preview area.

Note that if a display object is displayed instead of an operation object while the user is performing a touch operation on the enlarged preview image, the user who is operating the enlarged preview image can be provided with information about the enlarged preview image that is being displayed.

According to this embodiment, it is possible to switch objects to be displayed in the preview area depending on a touch operation performed by the user on the preview area. Thus, it is possible to increase the visibility of the preview image displayed in the preview area.

In addition, since the embodiment has described an example of a case in which the preview area and the enlarged preview area have substantially the same size, the embodiment has described display control processing performed on objects on the enlarged preview image if a touch operation is detected on the preview area.

However, if the preview area is larger than the enlarged preview area, display control processing may be performed on objects on the enlarged preview image if a touch operation is detected on the enlarged preview area on the touch panel.

By hiding an object from display in the preview area in accordance with a user operation on the preview image, the user visibility of the image can be increased.

Other Embodiments

The present invention is also implemented by performing the following process. That is, software (program) that realizes the functions in the above embodiment is supplied to a system or an apparatus via a network or any storage medium, and a computer (or a CPU, an MPU, or the like) of the system or apparatus reads and executes the program.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

What is claimed is:

1. An image forming apparatus comprising:
one or more processors configured to:
cause a display to display an image and an item for accepting an instruction for changing a magnification of the displayed image, wherein a part of the displayed image is hidden by the displayed item;
cause, while the displayed image is touched, the display not to display the item; and
cause the display to display the item in accordance with an end of the touch.

2. The image forming apparatus according to claim 1, wherein the touch is an operation for changing a position of the displayed image.

3. The image forming apparatus according to claim 1, wherein the one or more processors are configured to display another item while the displayed image is touched.

4. The image forming apparatus according to claim 1, wherein the image is an image to be printed.

5. The image forming apparatus according to claim 1, wherein the image which is displayed with the item is a part of a preview image stored in the image forming apparatus.

6. The image forming apparatus according to claim 1, wherein the image which is displayed with the item is a part of a preview image stored in an external storage device.

7. The image forming apparatus according to claim 1, further comprising:
a scanner configured to scan a document to generate image,
wherein the displayed image is an image generated by the scanner.

8. An image forming apparatus comprising:
one or more processors configured to:
cause a display to display an image and an item for accepting an instruction for changing a magnification of the displayed image, wherein a part of the image is not displayed and the item is displayed instead of the part of image; and
cause, while the displayed image is touched, the display to display the part of the image and not to display the item,
wherein the part of the image is to be not displayed in accordance with an end of the touch.

9. The image forming apparatus according to claim 8, wherein the touch is an operation for changing a position of the displayed image.

10. The image forming apparatus according to claim 8, wherein the one or more processors are configured to display another item while the displayed image is touched.

11. The image forming apparatus according to claim 8, wherein the image is an image to be printed.

12. The image forming apparatus according to claim 8, wherein the image which is displayed with the item is a part of a preview image stored in the image forming apparatus.

13. The image forming apparatus according to claim 8, wherein the image which is displayed with the item is a part of a preview image stored in an external storage device.

14. The image forming apparatus according to claim 8, further comprising:
a scanner configured to scan a document to generate image,
wherein the displayed image is an image generated by the scanner.

15. A control method for an image forming apparatus comprising:
displaying an image and an item for accepting an instruction for changing a magnification of the displayed image, wherein a part of the displayed image is not visible by the item; and
causing, while the displayed image is touched, the display not to display the item,
wherein the part of the item is to be not visible in accordance with an end of the touch operation.

16. The image forming apparatus according to claim 1, wherein one or more processors are configured to cause the display to display a reduced image in accordance with a tap operation to the displayed item.

17. The image forming apparatus according to claim 1, wherein the one or more processors are configured to cause the display to display the part of the image in accordance with a start of the touch.

* * * * *